United States Patent [19]

Ohno

[11] Patent Number: 4,460,382
[45] Date of Patent: Jul. 17, 1984

[54] BRAZABLE LAYER FOR INDEXABLE CUTTING INSERT

[75] Inventor: John M. Ohno, Plymouth, Mich.

[73] Assignee: General Electric Company, Schenectady, N.Y.

[21] Appl. No.: 331,377

[22] Filed: Dec. 16, 1981

[51] Int. Cl.³ ............................................. B24D 3/06
[52] U.S. Cl. ...................................... 51/307; 51/295; 51/309
[58] Field of Search ................ 51/307, 295, 309

[56] References Cited

U.S. PATENT DOCUMENTS

| | | | |
|---|---|---|---|
| 2,938,807 | 5/1960 | Anderson | 106/44 |
| 3,816,081 | 6/1974 | Hale | 29/182.7 |
| 4,018,631 | 4/1977 | Hale | 148/31.5 |
| 4,063,909 | 12/1977 | Mitchell | 51/309 |
| 4,120,731 | 10/1978 | Hillig et al. | 264/271 |
| 4,124,401 | 11/1978 | Lee et al. | 51/307 |
| 4,151,686 | 5/1979 | Lee et al. | 51/307 |
| 4,167,399 | 9/1979 | Lee et al. | 51/307 |
| 4,168,957 | 9/1979 | Lee et al. | 51/309 |
| 4,171,339 | 10/1979 | Lee et al. | 51/309 |
| 4,173,614 | 11/1979 | Lee et al. | 51/307 |
| 4,219,339 | 8/1980 | Wilson | 51/307 |
| 4,220,455 | 9/1980 | St. Pierre | 51/307 |
| 4,220,677 | 9/1980 | Fedoseev et al. | 427/215 |
| 4,231,195 | 11/1980 | DeVries et al. | 51/307 |
| 4,238,433 | 12/1980 | Hillig | 264/257 |
| 4,241,135 | 12/1980 | Lee et al. | 51/307 |
| 4,242,106 | 12/1980 | Morelock | 51/307 |
| 4,247,304 | 1/1981 | Morelock | 51/307 |
| 4,268,582 | 5/1981 | Hale | 428/446 |

FOREIGN PATENT DOCUMENTS

| | | |
|---|---|---|
| 010257 | 4/1930 | European Pat. Off. . |
| 012966 | 1/1979 | European Pat. Off. . |
| 2006733 | 5/1979 | United Kingdom . |

Primary Examiner—James H. Derrington
Attorney, Agent, or Firm—Hedman, Gibson, Costigan & Hoare

[57] ABSTRACT

A composite wafer bonded to a carbide substrate is formed by preparing a dispersion of super-hard crystals and carbon black in a temporary binder such as paraffin, by preparing a base mixture of carbon fiber, carbon black and filler in the temporary binder, and by preparing an additional mixture of cobalt and carbon black in the temporary binder. The dispersion, base mixture and additional mixture are compacted to form an intermediate composite, the additional mixture forming a layer on one surface of the base mixture. The intermediate composite is heated to allow for the removal of the temporary binder and the infiltration of liquefied silicon into the composite which is then reaction sintered to form the composite wafer.

6 Claims, 5 Drawing Figures

BRAZABLE LAYER FOR INDEXABLE CUTTING INSERT

BACKGROUND OF THE INVENTION

Articles composed of materials having refractory characteristics, hardness and resistance to wear have many important uses in the fields of metal machining.

Of particular importance in the field of such cutting inserts is a feature commonly referred to as "indexability", namely the provision of a plurality of cutting edges on each cutting insert. As each of the individual cutting edges becomes worn, the cutting insert, rather than merely being replaced, is simply rotated in its holder such that a new, unused cutting edge may be employed. In this manner, a plurality of cutting edges may be provided on a single cutting insert thus substantially reducing the cost of the cutting insert.

One such technique for forming an indexable cutting insert is disclosed in U.S. Pat. application Ser. Nos. 167,019 and 167,196, both filed July 9, 1980, both abandoned in favor of co-pending continuation applications Ser. Nos. 313,241, now U.S. Pat. No. 4,428,755 and 312,987, now U.S. Pat. No. 4,417,906 respectively, both by Dr. John Ohno, and assigned to the assignee of the present invention, the entire disclosures of which are hereby incorporated by reference. In these applications, a straight-forward technique (hereinafter referred to as the "press and treat" technique) for forming high quality cutting inserts having cutting surfaces at a plurality of locations, yet which readily lends itself to mass production is disclosed. Very briefly, the press and treat technique involves the preparation of a first dispersion of super-hard crystals such as diamond or cubic boron nitride crystals in carbon black, and a second dispersion of carbon black, carbon fiber and filler material. The two dispersions are individually mixed with a temporary binder such as paraffin to lend a sufficient green strength to the two dispersions upon cold compaction thereof. After compacting the two dispersions together in a configuration which provides a plurality of cutting edges on the cutting insert, the compact is vacuum heated in the presence of silicon to burn off the binder and to allow the silicon to infiltrate both dispersions. Upon further heating, and without the need for the constant application of any type of pressure to the insert, the silicon reacts with the carbon black to form a matrix of $\beta$-silicon carbide and silicon whcih bonds each dispersion both internally and to each other.

The wafers produced in accordance with the press and treat technique described above have been made experimentally from 0.07 to 0.18 inches in thickness. However, such wafers can be formed at substantially any thickness, inserts having a thickness of greater than 0.18 inches being readily obtainable. However, the strength of inserts made in accordance with the press and treat technique, like bonded dispersions of super-hard crystals in general, is similar to that of ceramics, and thus inadequate in certain situations. Thus, for an interrupted cutting application, or for the machining of very abrasive materials such as fiber glass reinforced plastics, graphite, ceramics, pre-sintered carbide, Al-Si alloys, Cu and Cu alloys, for example, all of which require a high degree of toughness for the cutting insert, the wafer must be mounted onto a carbide subtrate to make the cutting inserts. This is typically accomplished by the super pressure bonding of a polycrystalline material layer onto a carbide substrate which is in turn brazed onto another carbide, typically tungsten carbide. One such insert is CARBO-PAX ® manufactured by the assignee of the present invention. CARBO-PAX ®, is now in commercial use, but since the diamond cutting surface is disposed in one corner only, it is not indexable. Further, since each diamond cutting surface must be individually inserted into the carbide body, the CARBO-PAX ® inserts are expensive to make.

On the other hand, the wafers produced according to the press and treat technique are easily and quickly produced by the powder metallurgy process described above at low cost. Unfortunately however, such wafers are not brazable onto a carbide substrate. The conventional Mo-Mn technique and others described in "Mechanism of Ceramic-to-Metal Adherence", A. Pincus, *Ceramic Age,* March 1954, pages 16–33, and "A survey of Ceramic-to-Metal Bonding", A. R. Van Houten, *Ceramic Bulletin,* June 1959, pages 301–307, have been found to be unsuccessful in brazing this type of insert onto a carbide substrate.

SUMMARY OF THE INVENTION

It is therefore an object of the present invention to provide a process for brazing cutting inserts produced according to the press and treat technique onto a carbide substrate.

It is a further object of the present invention to provide a cutting insert produced in accordance with the press and treat technique which is brazed onto a carbide base.

It is a further object of the present invention to provide a cutting insert composite having a super-hard crystal dispersion cutting layer, a silicon carbide base layer and a thin layer containing $Co_xSi_y$ compounds for facilitating the brazing of the composite onto a carbide substrate.

In accordance with a first aspect of the invention, the process for producing the cutting insert bonded to a carbide substrate includes the preparation of a dispersion of super-hard crystals, such as diamond or cubic boron nitride crystals, in carbon black and a temporary binder. A base mixture of carbon fiber, carbon black and filler in a temporary binder is formed, and an additional mixture of cobalt and carbon black in temporary binder is also formed. The dispersion, base mixture and additional mixture are compacted together to form an intermediate composite, the additional mixture forming a layer on the surface of the base mixture. The intermediate composite is heated to allow for the removal of the temporary binder and the infiltration of liquefied silicon into the intermediate composite. The intermediate composite is then sintered to produce the composite wafer, which composite may be brazed onto a carbide substrate to make an indexable brazed cutting insert.

More specifically, the cutting insert may be air brazed onto the carbide substrate, the temperature of the dispersion being kept below approximately 620° C. for approximately one minute when brazed. The process may further include the provision of an additional cobalt coating in the cobalt layer to further facilitate the brazing of the composite wafer onto the carbide substrate.

As a further refinement of this aspect of the invention, the bottom surface of the base mixture may be provided with an indentation upon compaction to thereby compensate for warpage of the thin base mixture due to the pressureless reaction sintering.

In accordance with a second aspect of the invention, a composite wafer adapted to be brazed onto a carbide substrate includes at least one main layer internally bonded by a matrix of silicon and $\beta$-silicon carbide and an interface layer containing cobalt, silicon, $\beta$-silicon carbide and compounds of $Co_X Si_Y$, the interface layer facilitating the brazing of the composite wafer onto the carbide substrate. More particularly, the main layer may comprise a generally planar composite of at least one layer and a core unitd by a matrix of $\beta$-silicon carbide and silicon, the layer containing super-hard crystals such as diamond or cubic boron nitride crystals.

BRIEF DESCRIPTION OF THE DRAWINGS

These and other objects and aspects of the present invention will be described in more detail with reference to the following drawing figures of which.

DETAILED DESCRIPTION OF THE INVENTION

Figure 1:
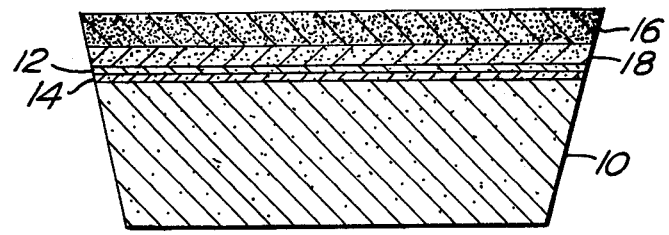
FIG. 1 is an illustration of a first embodiment of the present invention comprising a cutting insert produced in accordance with the press and treat technique brazed onto a carbide substrate through the use of a cobalt compound layer in accordance with the present invention.
Figure 2:
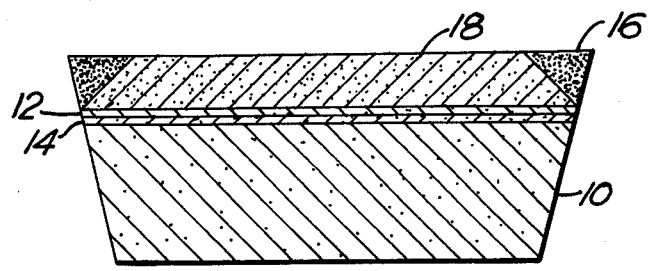
FIG. 2 is an illustration of an alternative configuration for the cutting insert also produced in accordance with the press and treat technique and brazed onto a carbide substrate through the use of the same cobalt compound layer.

FIGS. 1 and 2 illustrate the cutting inserts including composite layers 16 and 18 produced in accordance with the press and treat techniques disclosed in the above-mentioned U.S. patent application Ser. Nos. 167,197 now U.S. Pat. No. 4,322,872 and 167,019, respectively. Such composites are brazed onto a carbide substrate 10 through the use of an additional coating 12 and a standard brazing metal 14.

FIG. 1 illustrates the bi-layer composite produced according to the technique disclosed in Ser. No. 167,196, the composite having a diamond or cubic boron nitride impregnated cutting layer 16 and underlying silicon carbide base layer 18. The cutting insert produced in accordance with the technique disclosed in Ser. No. 167,019 shown in FIG. 2, provides the diamond impregnated cutting layer 16 only at the periphery of the silicon carbide base layer 18, rather than disposing the cutting layer over the entire surface of the silicon carbide layer as in the case of the FIG. 1 embodiment. Actually, any of the cutting inserts produced in accordance with the press and treat technique, such as those described in pending U.S. patent application Ser. Nos. 226,603; 226,604; 286,613; all by Dr. John M. Ohno and assigned to the assignee of the present invention, the entire disclosures of which are hereby incorporated by reference, as well as the inserts produced by the above-mentioned Ser. Nos. 167,019 and 167,196, may be bonded onto a carbide substrate using the technique described herein, the use of the particular inserts illustrated in FIGS. 1 and 2 being merely illustrative applications of the present invention.

The present invention provides an additional bottom coating 12 for the inserts produced by the press and treat technique which enables such composite wafers to be torch or induction brazed onto the carbide substrate in air, air brazing being the most convenient technique for mass production. However, the crystal impregnated layer 16 cannot be exposed to temperatures above 620° C. for more than a few minutes. Thus, layers 12 and 14 must provide for air brazing at a temperature below 620° C. in approximately one minute or so.

Figure 3:
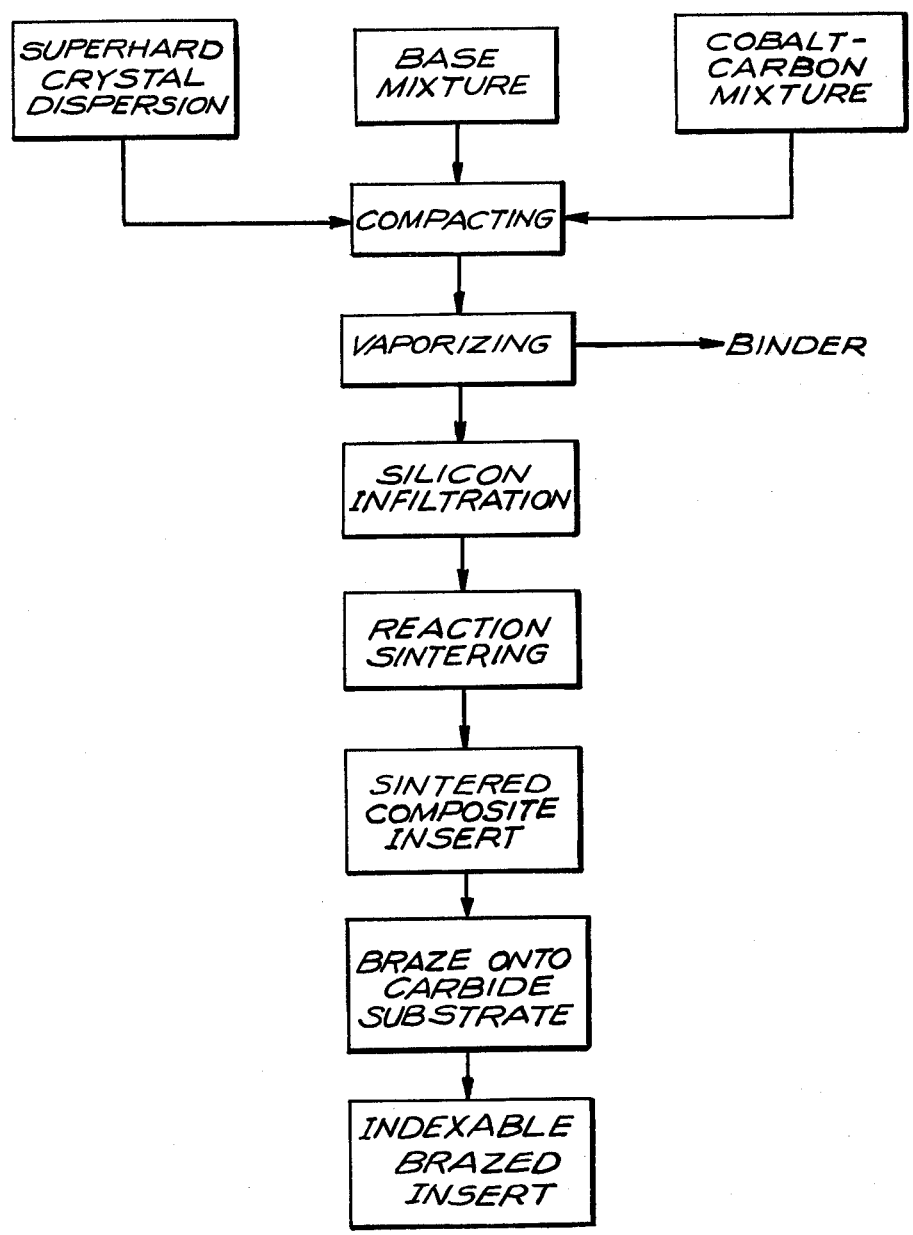
FIG. 3 is a block diagram illustrating the process for brazing a composite wafer produced in accordance with the press and treat technique onto a carbide substrate in accordance with the present invention.

Layer 12, produced in the following manner, provides a brazable surface for the composite and brazing at temperatures and for times within the constraints recited above. With further reference to FIG. 3, a very small amount of Co powder is mixed with carbon black and temporary binder such as paraffin to produce the cobalt-carbon mixture. This, along with the super-hard crystal dispersion and base mixture, is compacted in accordance with the press and treat process, to provide the composite wafer with bottom layer 12. During sintering, the silicon which infiltrates layer 12, as well as layers 16 and 18, reacts with the carbon black to produce $\beta$-silicon carbide and silicon and with the cobalt to produce $Co_X Si_Y$ compounds and cobalt at the sintering temperature. Consequently, the bottom of the insert is coated with a very thin layer of composite material containing Co, $Co_X Si_Y$, $\beta$-SiC and Si; such compounds and elements providing a composite wafer which is readily brazable onto a carbide substrate to make an indexable brazed cutting insert.

The amount of Co used in the formation of layer 12 depends on the thickness of the layer, the thinner the layer 12, the higher % of Co required. For a layer 12 having a thickness on the order of 1-2 mils, for example, a mixture containing approximately 10% Co may be used to form the layer. Other thicknesses and Co concentrations will, however, be apparent to those skilled in the art.

The sintered composite wafers having the above described cobalt layer may be successfully torched brazed in air onto a standard carbide such as grade 883 (WC+6%) through the use of a standard filter metal layer 14, such as ASTM BAg-1 without experiencing any deterioration of the diamond impregnated layer.

A further improvement in the brazability of the composite may be achieved through the use of a gentle sand blasting of layer 12.

It has been found that the composite layers react differently during reaction sintering due to the differences in composition, thereby causing a certain degree of warpage to the point where the bottom surface may not be of the degree of flatness necessary for a high quality brazing of the insert onto the carbide substrate. Unlike conventional sintering, there is no shrinkage but the volumetric increase depends on the thickness of the layer. Thus, by configuring the bottom surface of layer 18 as illustrated in FIGS. 4a and 4b, such warpage can be compensated for to the degree necessary for proper brazing.

Figure 4A:
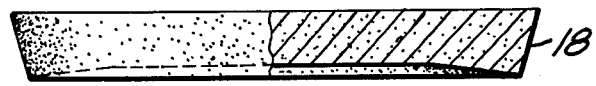
FIG. 4a is a front view of the contour of the lower layer of the composite wafer provided in order to compensate for warpage which may occur during the pressureless reaction sintering.
Figure 4B:
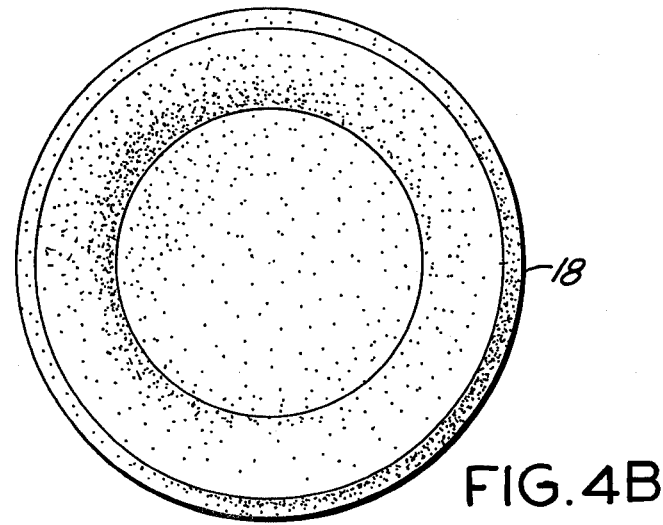
FIG. 4b is a bottom view of the lower layer so configured.

With the specific reference to FIGS. 4a and 4b, it can be seen that layer 18 is formed with a small degree of indentation at its lower surface (an angle of inclination of approximately 5°) such that the bottom surface of layer 18 is substantially flat after reaction sintering of the composite wafer. It has been found that in order to avoid excessive warpage the additional layer 12 should be limited to a thickness of less than approximately 0.015 inches.

The use of the composite wafer produced by the press and treat technique provides a wide variety of designs, and through the use of the additional cobalt layer in accordance with the present invention such wafers are readily brazable onto a carbide substrate. The composites thus produced in accordance with the present invention do not rely on the use of high pressure and temperature processes such as those disclosed in U.S. Pat. Nos. 4,124,401, 4,167,399 and 4,173,614 to Lee et al., all of which are assigned to the assignee of the present invention. Additionally, the inserts produced in accordance with present invention may provide full indexability and readily lend themselves to mass production techniques.

While the preferred embodiments and examples have been described in the foregoing specification and drawings, the scope of the invention shall now be defined with reference to the following claims.

I claim:

1. A process for producing a cutting insert bonded to a carbide substrate comprising:

preparing a dispersion of super-hard crystals selected from at least one member from the group consisting of diamond and cubic boron nitride crystals in carbon black and a temporary binder;

forming a base mixture of carbon fiber, carbon black and filler in a temporary binder;

forming an additional mixture of cobalt and carbon black in a temporary binder;

compacting said dispersion, base mixture and additional mixture together to form an intermediate composite, said additional mixture forming a layer on one surface of said base mixture and said dispersion forming a layer on another surface of said base mixture;

heating said intermediate composite to allow for the removal of said temporary binder and the infiltration of liquefied silicon into said intermediate composite;

sintering said intermediate composite to produce a composite wafer having cobalt, silicon, $\beta$-silicon carbide and compounds of $Co_x Si_y$ at said layer on the surface of said base mixture; and brazing said composite wafer onto said carbide substrate.

2. The process of claim 1 wherein said cutting insert is air brazed onto said carbide substrate and the temperature of said dispersion is kept below approximately 620° C. for less than approximately one minute when brazed.

3. The process of claim 1 further comprising providing an indentation on said one surface of said base mixture upon compaction to thereby compensate for warpage of said base mixture.

4. The product produced in accordance with the process of any one of claims 1-3.

5. A composite wafer adapted to be brazed onto a carbide substrate, comprising:

at least one main layer internally bonded by a matrix of silicon and silicon carbide, and containing super-hard crystals selected from at least one member of the group consisting of diamond and cubic boron nitride crystals; and an interface layer containing cobalt, silicon, $\beta$-silicon carbide and compounds of $Co_x Si_y$, said interface layer facilitating the brazing of said cutting insert onto said carbide substrate.

6. The cutting insert of claim 5 wherein said at least one main layer comprises a generally planar composite of at least one layer and a core united by a matrix of $\beta$-silicon carbide and silicon.

* * * * *